April 22, 1969    F. H. ATTIX    3,440,420
METHOD OF DETERMINING RADIATION DOSE THROUGH A PACKAGE
AND DOSIMETER THERFOR
Filed April 30, 1965

INVENTOR
FRANK H. ATTIX

BY *Melvin L Crane* AGENT

*[signature]* ATTORNEY

United States Patent Office 3,440,420
Patented Apr. 22, 1969

3,440,420
METHOD OF DETERMINING RADIATION DOSE THROUGH A PACKAGE AND DOSIMETER THEREFOR
Frank H. Attix, 2125 27th Ave.,
Hillcrest Heights, Md. 20031
Filed Apr. 30, 1965, Ser. No. 452,411
Int. Cl. G01t 1/02
U.S. Cl. 250—83                                      9 Claims

ABSTRACT OF THE DISCLOSURE

The subject matter of the present invention is directed to a radiation detection system and method for accurately determining radiation dose received by a substance subjected to a radiation source such as an electron beam from an accelerator. The items to be irradiated are placed on a conveyor belt or such similar device on which the items pass through the radiation source. Subsequent to being irradiated, the items are checked to determine the proper amount of radiation dose. Strips of material affected by a radiation source are applied to each, the upper and lower surfaces of each item, thus each dosimeter is examined on the item by an optical system in which the amount of light from a light source passing through the radiation dose material is reflected back to a detector. The reading of the detector indicates whether the item was subjected to sufficient radiation or whether too little or too much radiation was incident on the item. Each item is checked across the width and length of the upper and lower side to insure that the items have been irradiated entirely across the width and length thereof.

---

The invention described herein may be manufactured and used by or for the Government of the United States of America for governmental purposes without the payment of any royalties thereon or therefor.

The present invention relates to means for determining the dose of radiation which a substance has received, and more particularly to a dosimeter, a radiation detection system and method for accurately determining the radiation dose received by a substance subjected to a radiation source such as an electron beam from an accelerator.

Irradiation of materials to large doses for various purposes, such as for the prevention of food spoilage, the preservation of tissue and organ specimens, the sterilization of drugs and surgical supplies, and the modification of the physical characteristics of plastics, has become increasingly common in recent years. In determining the amount of radiation energy absorbed in the irradiated item, various indicating means have been used. The indicating means used heretofore have been either (a) the "go, no-go" type, in which the radiation detector indicates by an abrupt physical change that some definite dose of radiation has been exceeded, or (b) the comparative-scale visual type, in which a patch of radiation-sensitive dye, paint, or photographic print-out paper is compared visually with a graded scale of colors or degree of darkening to determine the dose semi-quantitatively, or, (c) quantitative dosimeters which exhibit a gradual change in some measurable characteristic (e.g. optical density) as a function of dose.

These devices all have their drawbacks: The "go, no-go" type of dosimeter only tells whether a dose is above or below a threshold, and is therefore not quantitative in a rigorous sense. The visual-comparison type allows too much margin for subjective error, and in any case yields only semi-quantitative results (i.e. that the dose lies between $1 \times 10^6$ and $2 \times 10^6$ rad). Both these types may, however, remain attached to the package during observation to obtain the dose measurement.

The quantitative type dosimeters, on the other hand, have in prior art required removal from the irradiated package and insertion into a suitable instrument for measuring the radiation-dependent parameter used as the dose indicator. The system based on the increase in optical density of polyvinylchloride film, for instance, requires that the dosimeter must not only be removed from the package, but must be heat treated to stabilize the coloration resulting from the radiation, prior to measurement of the optical density. This heat treatment is necessitated by the time-dependent buildup of the coloration after the irradiation is completed, and the fact that the optical density measurement may not always be made after the same time delay following the irradiation. The separation of the dosimeter from the package also leads to extra "bookkeeping" to identify the proper dosimeter as belonging to each specific package.

The inconvenience of obtaining quantitative information on dose has usually resulted in dosimeters being placed only with a representative sample of the packages to be irradiated. This allows the possibility that some packages might (in case of malfunctioning equipment) traverse the irradiation facility with the receipt of an improper dose of radiation. The hazard with, say, surgical sutures, is obvious.

The present invention sets forth a dosimeter useful in a system by which different articles or elements may be irradiated and to a method for determination of the amount of radiation to which the article has been subjected. The dosimeter is formed by an optically transparent material to which a reflective backing surface is applied and then a pressure sensitive adhesive is applied to the backing surface for securing the dosimeter to an item to be irradiated. The dosimeter material is placed onto an item such that the entire width and length of the element is checked for proper radiation incidence. In order to determine whether or not the radiation has passed entirely through the item, a dosimeter element is secured to both the top and bottom of the item. Thus, radiation must pass entirely through the item in order to be detected. The dosimeter is useful for conveyor belt operation and a hand operated or automatic radiation detection means may be used to determine the dose. Both the upper and lower dosimeters are checked and both the width and length are checked to insure application of a proper dosage across the width, length and thickness of the item.

It is therefore an object of the present invention to provide a dosimeter and method of measuring the radiation dose to an item, to ensure proper radiation exposure of the item.

Another object is to provide a method by which all irradiated items may be checked quickly and accurately for proper dose within a desired range.

Still another object is to provide a radiation detection system for accurately determining the radiation dose received by a substance subjected to a radiation source.

Yet another object is to provide a system whereby the radiation dose received across each dimension of an object is determined.

Other objects and advantages of this invention will be readily appreciated as the same becomes better understood by reference to the following detailed description when considered in conjunction with the accompanying drawing, in which.

Figure 1:
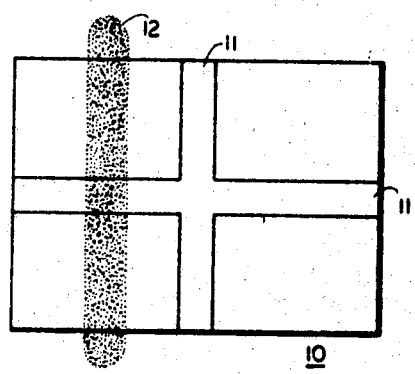
FIG. 1 illustrates the top view of a package having a dosimeter on the upper surface thereof and extending across each dimension.

Now referring to the drawing there is shown for illustrative purposes only a package 10 to be irradiated by a radiation source. The package in FIG. 1 has a dosimeter 11 attached thereto on the upper and lower surface. The dosimeter extends across each dimension of the top and bottom to insure a radiation dose that extends completely across each dimension. A cross-sectional outline of an electron beam 12 is shown on FIG. 1 to illustrate that the beam does extend across the entire width of the package, which may be accomplished by the rapid lateral scanning of a narrow electron beam, from a Van de Graff accelerator for example. The dosimeter strip along the length will indicate whether the radiation source was incident uniformly on the package during the entire transit under the beam. Likewise the dosimeter across the width can indicate that the radiation beam is at least as wide as the package, and of uniform intensity over its full width.

Figure 2:
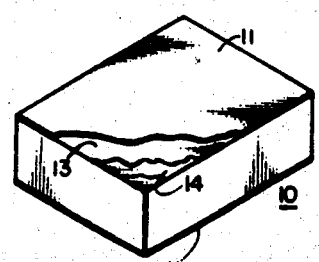
FIG. 2 illustrates a package in perspective illustrating a dosimeter on the upper and lower surface thereof.
Figure 3:
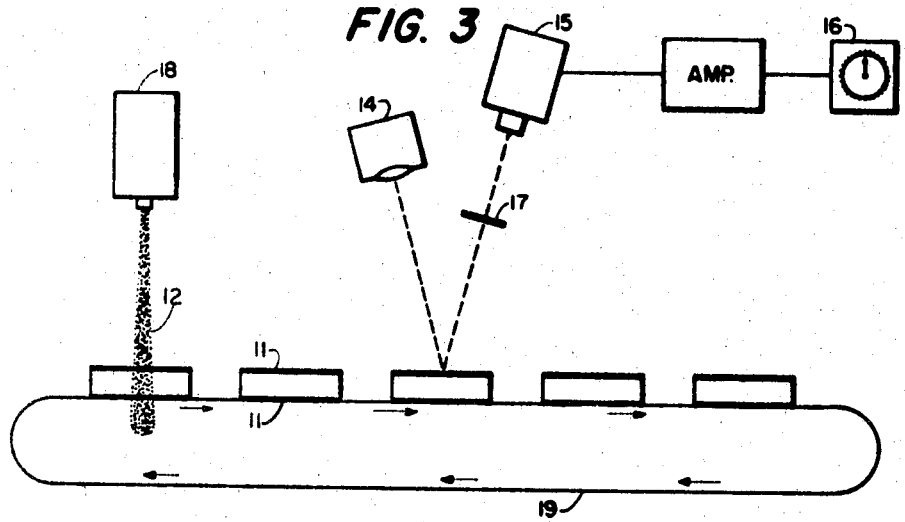
FIG. 3 illustrates a series of packages passing a radiation source and a detector for indicating the amount of radiation received.

FIG. 2 illustrates perspective view illustrating a dosimeter 11 on the bottom and top of the package wherein the dosimeter covers the entire surface of the package. The dosimeter shown by illustration in each figure is made of a material, the optical density of which is increased or decreased in a desired wavelength region by the action of ionizing radiation. Many flexible as well as rigid plastic materials may be used as the basic dosimeter material, such as polyvinylchloride, dyed cellophane, Mylar, or polymethylmethacrylate. A layer of light-reflecting material 13 such as aluminum foil, white paint, white paper or any other suitable light reflective material is applied to the surface of the plastic that is secured adjacent to the package. Where the surface of the package has a reflective surface the plastic could be secured directly onto the surface without the need of a reflective surface on the surface of the plastic adjacent to the package to be irradiated. The reflective surface could be evaporated or sputtered onto the plastic or any other suitable method can be used. The reflective coated side of the plastic has a pressure-sensitive clear adhesive 14 applied thereto in order to easily secure the dosimeter to the package to be irradiated. Since a clear adhesive is applied to the dosimeter, a finely subdivided reflecting material such as aluminum powder or magnesium oxide may be mixed with the clear adhesive substance and then the mixture applied to the surface of the plastic. The important element is to have a reflective surface on either the plastic or package and that the dosimeter adhere to the surface of the package. The manner in which this is done is unlimited and within the skill of one in the art since the teaching has been set forth above. The outer or non-reflective surface of the dosimeter may be roughened by some means such as an abrasion or etching to prohibit the specular reflection of incident light.

The dosimeter of the present invention may be secured to the surface of the package and left thereon permanently. The dosimeter may be placed thereon as individual pieces or strips so long as both the entire width and length are checked for radiation dosage, or entirely covering the surface or surfaces of the package. To insure satisfactory irradiation, a dosimeter is secured to the upper and lower surface of each package, thus determining both the entrance dose and the exit dose.

After exposure to a radiation field, from a radiation source 18, the package is checked either immediately or after some fixed time period, depending on the speed of the conveyor belt 19 and the distance to the dosimeter-reading instrument, to determine whether or not it received the proper amount of radiation. Variation of dosimeter indication with time after irradiation, such as exhibited by the variation of optical density in polyvinylchloride, will not cause errors so long as the belt-speed remains constant. Thus heat treatment of such dosimeters will not be necessary. Time-stable dosimeters are to be preferred, however.

The dosimeters are checked optically by use of a light source 14, a light detector 15, and an indicator 16, which indicates a satisfactorily or an unsatisfactorily irradiated package. An optical filter 17, is placed in front of the light detector to pass only the desired wavelength band, and thus eliminate unnecessary "background" light. Nevertheless a tunnel-like light screen enclosing the conveyor belt may be necessary to shut out ambient light in brightly-lighted areas.

The package is passed under the light source over the entire length and width for each the upper and lower surface. By passing the package under the exposure detector for each dimension, both top and bottom, one can be reasonably assured that the package has received the correct amount of radiation over the entire area, and throughout its full depth. If there is an incorrect dose for some reason the indicator will so indicate.

In checking the irradiated package, the light beam is directed onto the dosimeter on the package, the light passes through the dosimeter material and is reflected back through the dosimeter material. The reflected light is detected by a photomultiplier tube or other detector and the output of the photomultiplier tube is amplified and directed to a meter or indicator which has been calibrated to indicate a dose range. The indicator may have a visual or audible alarm to indicate a dose falling outside acceptable limits. The light on passing through the dosimeter twice (once going in and once on being reflected back) is attenuated to an extent governer by the optical density, and thus by the dose received. Thus, from the amount of light received by the photomultiplier tube, the dose of the radiation passing through the dosimeter and subsequently the package can be determined.

The radiation dose indicating device is adjusted so that intensities of the reflected light within a specified range of values will determine a package satisfactory with respect to the dose received by it. Reflected light intensities found to be too low or too high would mean the package had received too much or too little radiation and the package would be rejected. Too high or too low a dose can come about by interruption of the radiation beam during the time the package is being irradiated, by stoppage of the package under the radiation beam, by a change in the electron beam current or voltage, or by other factors.

By securing the dosimeter to a package in strips such as shown in FIG. 1, on the top and bottom, or completely covering the top and bottom as shown in FIG. 2, the package can be scanned in each direction across both the top and the bottom. Thus, the uniformity of the dose from end to end in each dimensional direction on both the top and the bottom can be determined. Such measurements can be made "by hand" in which case an operator checks each side across each dimension of the irradiated package as it leaves the radiation source, or the dose may be measured automatically. Automatic checking may be carried out by passing the packages from the radiation source through a first reader, rotating the package 90° in its horizontal plane and passing the package through a second reader. The package is then turned over and passed through a third reader, and finally rotated about a vertical axis 90° and passed through a fourth reader. The dosimeter reader can be equipped with a signaling device of some type to indicate a package that does not meet the standards, so that it may be discarded by hand. Also, by further mechanization, a device can be added to the system that will automatically remove or reject those packages that do not meet the standards. It will also be obvious to one skilled in the art that the readers may be placed above and below the package, which would then require only one rotation of 90 degrees about the vertical axis.

Where the uniformity of the radiation field in space and time is highly reliable, only one dosimeter on a small area of the top and/or bottom of each package may be required.

As stated previously the light beam is positioned to impinge on the surface of the package, and the surface of the dosimeter is roughened. Roughening the surface eliminates errors due to slight variations in the angle of the dosimeter with respect to the incident light beam and the reflected beam. Measurement of a diffusely-reflected light beam rather than a specularly-reflected beam improves the accuray and reliability of the system. The use of strips of dosimeter material secured to a package and the checking of the package in more than one direction insures a measurement of the entire dose distribution to determine whether or not the package is safe and meets the required standards.

Obviously many modifications and variations of the present invention are possible in the light of the above teachings. It is therefore to be understood that within the scope of the appended claims the invention may be practiced otherwise than as specifically described.

What is claimed is:
1. A system for irradiating a package with a dosimeter secured thereto and determining a specified range of radiation dose to which said package has been subjected which comprises:
 a radiation source adapted to produce a beam of radiation having the width to irradiate the width of said package,
 means for moving said package through said beam from said radiation source,
 a light source arranged to radiate a light beam through said dosimeter on said package subsequent to said package passing through said radiation beam,
 a light detector arranged to detect light reflected back through said dosimeter, and
 an indicator connected with said light detector to receive an electrical signal therefrom to indicate the radiation dose received by said package in accordance with the electrical signal produced by said light detector.

2. A method of quantitatively determining a radiation dose received by an article irradiated by a source of radiation which comprises:
 securing a light reflective type dosimeter to a package to be irradiated across the width and length thereof,
 passing said package with the dosimeter thereon through a uniform radiation source beam at a uniform rate of advance,
 passing the irradiated package with the dosimeter thereon through a light beam,
 detecting said light beam reflected from said dosimeter on said package, and
 indicating the amount of radiation in accordance with the light reflected from said dosimeter.

3. A method of subjecting a package to a radiation dose and quantitatively determining the dosage received by said package which comprises:
 securing a dosimeter of light reflective type onto said passage, on each, the top and bottom surfaces of said package,
 passing said package with the attached dosimeters thereon through a uniform radiation source beam at a uniform rate of advance,
 passing said irradiated package and the dosimeter on the top surface thereof through a light beam,
 detecting light reflected back from said dosimeter on the top surface while passing through the light beam,
 indicating the amount of radiation incident on said dosimeter on the top surface of said package in accordance with the light reflected back by said dosimeter and detected,
 passing the package and the dosimeter on the bottom surface through a light beam,
 detecting the light reflected back from said dosimeter of the bottom surface of the package, and
 indicating the amount of radiation incident on said dosimeter on the bottom surface of said package in accordance with the amount of light reflected back by the dosimeter and detected.

4. In a method of sterilizing or otherwise processing a material by means of high energy radiation, the steps of measuring the distribution of the quantity of dose deposited by a source of high energy radiation which comprises:
 securing a first dosimeter onto the upper surface of a material to be sterilized,
 securing a second dosimeter onto the bottom surface of said material to be sterilized,
 said first and second dosimeters comprising a transparent material, the optical density of which changes in some wavelength region by action of a quantity of radiation, a reflective layer applied onto one surface of said transparent material and an adhesive on said reflective layer by which the dosimeters are secured to said material to be sterilized,
 passing said material to be sterilized with the dosimeters secured thereto through the radiation beam emitted by said source of high energy with said first dosimeter facing said high energy source,
 passing said irradiated material through a light beam with said first dosimeter facing said light beam,
 detecting light reflected back by the reflective layer on said first dosimeter,
 determining the quantity of radiation dose deposited in said material from the detected light reflected back from said first dosimeter,
 passing said irradiated material through a light beam with said second dosimeter facing said light beam,
 detecting light reflected back by the reflective layer on said second dosimeter, and
 determining the quantity of radiation dose deposited in said second material from the detected light reflected back from said second dosimeter.

5. In a method as claimed in claim 4; which further includes,
 rotating said package 90 degrees in the same plane subsequent to passing said package through said light beam and detector with said first dosimeter facing said light beam and passing said rotated package through said light beam a second time prior to passing said package through said light beam and detector with said second dosimeter facing said light beam, and
 rotating said package 90 degrees in the same plane subsequent to passing said package through said light beam with said second dosimeter facing said light beam and passing said rotated package through said light beam and detector a second time with said second dosimeter facing said light beam.

6. A dosimeter formed of a material capable of changing its optical density as a function of the extent of radiation impinging thereon,
 a reflective coating on one surface of said material, and
 a pressure-sensitive adhesive backing on said coated surface.

7. A dosimeter as claimed in claim 6 wherein:
 said material surface opposite from said coated surface is roughened.

8. A dosimeter formed of a material capable of changing its optical density as a function of the extent of radiation impinging thereon,
 a mixture of pressure sensitive finely divided reflecting material,
 said mixture applied to one side of said material.

9. A dosimeter as claimed in claim 8 wherein:
 said material surface opposite from said coated surface is roughened.

References Cited

UNITED STATES PATENTS

| | | | |
|---|---|---|---|
| 2,882,414 | 4/1959 | Joyner et al. | |
| 2,937,279 | 5/1960 | Artandi et al. | |
| 2,987,619 | 6/1961 | Rosenfeld | 250—7 X |
| 3,012,142 | 12/1961 | Etzel. | |
| 3,051,837 | 8/1962 | Mitka | 250—83 |
| 3,061,723 | 10/1962 | Kapff | 250—83 X |

OTHER REFERENCES

Luminescence, Attix, F. H., Nucleonics, October 1959, pp. 60–61.

RALPH G. NILSON, *Primary Examiner.*

SAUL ELBAUM, *Assistant Examiner.*

U.S. Cl. X.R.

250—071; 252—301.2